US011108872B2

(12) United States Patent
Sakamoto (10) Patent No.: US 11,108,872 B2
(45) Date of Patent: Aug. 31, 2021

(54) SYSTEM AND METHOD USING THE SAME, INFORMATION PROCESSING APPARATUS AND METHOD USING THE SAME, AND STORAGE MEDIUM

(71) Applicant: CANON KABUSHIKI KAISHA, Tokyo (JP)

(72) Inventor: Koji Sakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/943,219

(22) Filed: Jul. 30, 2020

(65) Prior Publication Data
US 2020/0358862 A1  Nov. 12, 2020

Related U.S. Application Data

(63) Continuation of application No. PCT/JP2019/002686, filed on Jan. 28, 2019.

(30) Foreign Application Priority Data

Jan. 30, 2018  (JP) .............................. JP2018-013992

(51) Int. Cl.
*G06F 15/173* (2006.01)
*H04L 29/08* (2006.01)
*H04L 29/12* (2006.01)
*H04L 29/06* (2006.01)

(52) U.S. Cl.
CPC .......... *H04L 67/16* (2013.01); *H04L 61/2046* (2013.01); *H04L 67/34* (2013.01); *H04L 67/42* (2013.01)

(58) Field of Classification Search
CPC ..... H04L 67/16; H04L 61/2046; H04L 67/34; H04L 67/42
USPC ........................................................ 709/223
See application file for complete search history.

(56) References Cited

U.S. PATENT DOCUMENTS

| 8,156,329 | B2 | | 4/2012 | Ohashi |
| 8,375,434 | B2 | * | 2/2013 | Cottrell ............... H04L 63/0414 |
| | | | | 726/12 |
| 9,232,560 | B2 | * | 1/2016 | Hsu ...................... H04L 69/167 |
| 9,361,050 | B2 | | 6/2016 | Sakamoto |
| 9,489,218 | B2 | | 11/2016 | Otsuka |
| 10,032,096 | B2 | | 7/2018 | Nakamura |

(Continued)

FOREIGN PATENT DOCUMENTS

| JP | 2009301111 A | 12/2009 |
| JP | 2012048467 A | 3/2012 |
| JP | 2017-156875 A | 7/2017 |

(Continued)

OTHER PUBLICATIONS

International Preliminary Report on Patentability dated Aug. 13, 2020 in corresponding international patent application PCT/JP2019/002686.

(Continued)

*Primary Examiner* — Atta Khan
(74) *Attorney, Agent, or Firm* — Venable LLP (57) ABSTRACT

The present invention provides a system in which, via a web page provided using a web browser by a management server, a management screen provided by a network device can be accessed while the management server does not need to have a private IP address of the network device.

17 Claims, 9 Drawing Sheets

(56) References Cited

U.S. PATENT DOCUMENTS

2009/0307752 A1    12/2009  Ohashi
2012/0054607 A1     3/2012  Otsuka

FOREIGN PATENT DOCUMENTS

JP          2017156875 A    9/2017
JP          2017168140 A    9/2017

OTHER PUBLICATIONS

International Search Report issued in corresponding International Application No. PCT/JP2019/002686 dated Mar. 12, 2019.

* cited by examiner

| NETWORK DEVICE ID ~500 | USER ORGANIZATION ID ~501 | PRODUCT NAME ~502 | STATUS ~503 | REGISTRATION DATE ~504 |
|---|---|---|---|---|
| NE0001 | U0001 | PROD001 | - | 2017/5/3 |
| NE0002 | U0001 | PROD001 | ERROR HAS OCCURRED | 2017/5/3 |
| NE0003 | U0001 | PROD002 | - | 2017/5/3 |
| NE0004 | U0002 | PROD002 | - | 2017/6/6 |
| ... | ... | ... | ... | ... |

| NETWORK DEVICE ID ~800 | NETWORK ADDRESS ~801 |
|---|---|
| NE0001 | 172.20.10.1 |
| NE0002 | 172.20.10.4 |
| NE0003 | 172.20.10.7 |
| ... | ... |

FIG. 9

| URL PARAMETERS ~900 | |
|---|---|
| <a href="http://Management_Server/deviceSearch/deviceSearch.application?TargetDevice1=NE001&Device2=NE002&Device3=NE003">Link(NE001)</a> | ~901 |
| <a href="http://Management_Server/deviceSearch/deviceSearch.application?T argetDevice1=NE002&device2=NE001&device3=NE003">Link(NE002)</a> | ~902 |
| <a href="http://Management_Server/deviceSearch/deviceSearch.application?T argetDevice1=NE003&device2=NE001&device3=NE002">Link(NE003)</a> | ~903 |

SYSTEM AND METHOD USING THE SAME, INFORMATION PROCESSING APPARATUS AND METHOD USING THE SAME, AND STORAGE MEDIUM

CROSS-REFERENCE TO RELATED APPLICATIONS

This application is a Continuation of International Patent Application No. PCT/JP2019/002686, filed Jan. 28, 2019, which claims the benefit of Japanese Patent Application No. 2018-013992, filed Jan. 30, 2018, all of which are hereby incorporated by reference herein in their entirety.

BACKGROUND OF THE INVENTION

Field of the Invention

The present invention relates to a technique with which a management server manages network devices over a network.

Description of the Related Art

In recent years, network device management systems have been used in which network devices located in LANs (Local Area Networks) are managed by one or more management servers connected to the network devices over the Internet. Such a management server can receive and accumulate information from network devices about the hardware and software configurations of the devices, the operation of the devices, and the occurrence of failures in the devices. The management server has portal screen functionality of providing the accumulated information to users in order to inform the users of the use statuses of and failure occurrence statuses in the devices.

Each network device, in turn, has the functionality of providing, via a web server for the device, a remote management screen in which device operation information is displayed to allow the user to modify settings. The user can connect to the remote management screen using a web browser installed in a client apparatus, such as a PC (Personal Computer), residing in the LAN in which the network device is located. To connect to the screen, the user needs to enter the network device's network address used in the private network (referred to as a private IP address) into a web browser.

Japanese Patent Application Laid-Open No. 2017-168140 discloses a method of providing access to a screen implemented in a network device. The network device is an image forming apparatus such as a printer, and the screen is used for performing a print process. The method in Japanese Patent Application Laid-Open No. 2017-168140 is similar to the above-described method of connecting to the remote management screen using the client apparatus in that access to functionality of a network device is provided. In Japanese Patent Application Laid-Open No. 2017-168140, the method for the user to access the network device from the client apparatus is described as a method involving the user himself/herself specifying a network address of the device.

Now, when the user attempts to access the above remote management screen, the task of checking the private IP address of the network device may be troublesome. For example, if many network devices are being managed, checking the private IP address of each device is demanding. In addition, the private IP address assigned to each network device may be periodically updated. The user then needs to check the latest private IP address each time the user desires to access the remote management screen, which is inefficient.

A possible way to solve the above inconvenience may be as follows. Each network device transmits the private IP address to the management server over the Internet. The management server records the received private IP address in association with the serial number of the network device (an ID unique to the device). The user can then access the device by accessing the management server using the web browser of the PC and by referring to the private IP address of the network device in a given web page.

However, nowadays it is desired not to transmit information that includes confidential or personal information from network devices to management servers over the Internet. In view of the trend of the times, transmitting the private IP address of the network device over the Internet is unpreferable. Avoiding the transmission of the private IP address to the management server, however, prevents the management server from providing the above-described functionality that enables the user to access the remote management screen of the network device.

SUMMARY OF THE INVENTION

A system of the present invention includes: an information processing apparatus connected to a network environment where a network device is located; and a management server managing the network device from outside the network environment without holding local address information used in the network environment where the network device is located. The management server includes a providing unit that provides page information, the page information including: a description for passing an identifier for identifying the network device being managed to an application executed in the information processing apparatus; and a page object associated with the description. The information processing apparatus includes, as functionality of the application: a search unit that performs a search process in the network environment if the page object is selected via a screen displayed based on the page information in a web browser executed in the information processing apparatus; and a presentation unit that, if a network device corresponding to the identifier passed from the web browser to the application in response to selecting the page object is found in the search process, presents information for accessing a management screen provided by the network device, the information being presented using local address information acquired from the network device corresponding to the identifier and found in the search process.

Further features of the present invention will become apparent from the following description of exemplary embodiments with reference to the attached drawings.

DESCRIPTION OF THE EMBODIMENTS

Exemplary embodiments for implementing the present invention will be described below with reference to the drawings.

The present invention proposes a method in which functionality of a network device is accessed while a management server that connects to the network device over the Internet to acquire operation information about the network device does not need to receive a local network address from the network device.

First Embodiment

First, a network system in a first embodiment will be described. The network system includes a management system (a management server 100), and a client apparatus 101 and network devices 102 being managed by the management system.

Figure 1:
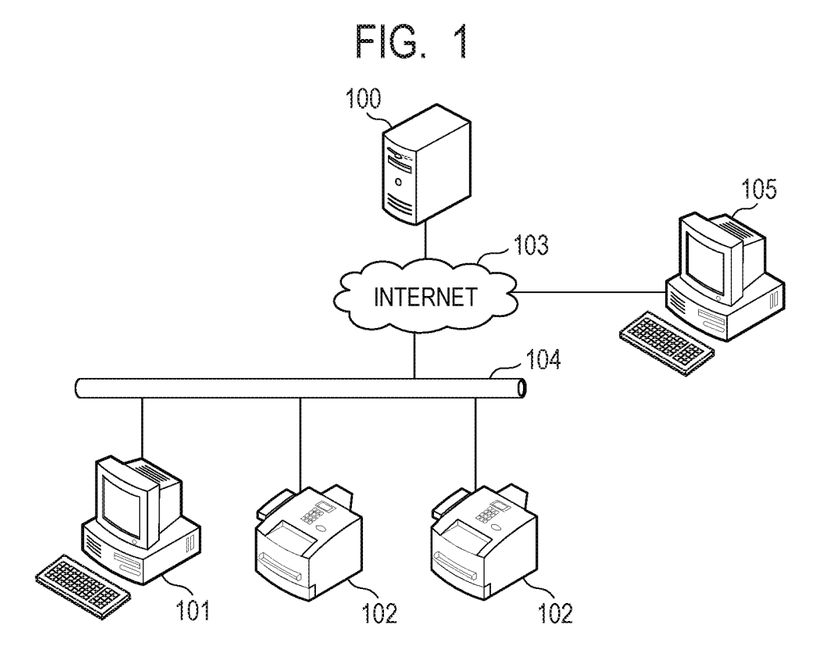
FIG. 1 is a diagram illustrating an exemplary system configuration.

FIG. 1 illustrates a configuration in which the management server 100 connects, over the Internet 103, to the client apparatus 101 and the network devices 102 located in a local network environment (a network 104). In the embodiment, the management server 100 serving as the management system is illustrated as implemented by a single information processing apparatus. Alternatively, the management server 100 may be implemented by distributing its functionality among multiple information processing apparatuses. Further, a client apparatus 105 connects to the management server over the Internet 103. Although the embodiment describes the network devices 102 as image forming apparatuses, this is exemplary and does not limit the application scope of the present invention.

The management server 100 is a server that centrally manages network devices 102 in network environments of many end users (customers who own the network devices). The management server 100 can centrally manage, over the Internet 103, network devices 102 in multiple local networks.

The client apparatus 101 is an information processing apparatus such as a personal computer (PC), with which an end user who is an information device management worker connects to the management server 100 for checking the operation status of one or more network devices 102. Operations performed with the client apparatus 101 include using a web browser or the like to refer to management information transmitted from each network device 102 to the management server 100. The client apparatus 101 can also be used to receive an e-mail message sent when the management server 100 detects that each network device 102 is running out of a consumable item.

The network devices 102 are image forming apparatuses with printer, fax, and copy functionality. Each network device 102 can transmit management information, such as the number of printed sheets and the degrees of exhaustion of consumable items in the device, in association with the serial number of the device (a unique device ID) to the management server 100.

Although not illustrated in FIG. 1 for simplicity, multiple local networks 104 may exist in the Internet 103. In the illustrated configuration, each network device 102 transmits the management information about the device directly to the management server 100. In an alternative configuration, an intermediary agent apparatus may acquire the information about the network device 102 and transmit the information to the management server 100. Multiple such agent apparatuses may be assigned to the respective network devices 102, or a single agent apparatus may have capability to manage multiple network devices 102 in the local network 104.

The client apparatus 105 is used by a worker of a sales company or a maintenance service to access the management server 100 over the Internet 103. The operator, purpose of use, and location of the client apparatus 105 are different from those of the client apparatus 101, but the hardware and software configurations of the client apparatus 105 are similar to those of the client apparatus 101. Operations performed with the client apparatus 105 include registering, viewing, updating, and deleting the information about the network devices 102 in the management server 100.

Figure 2:
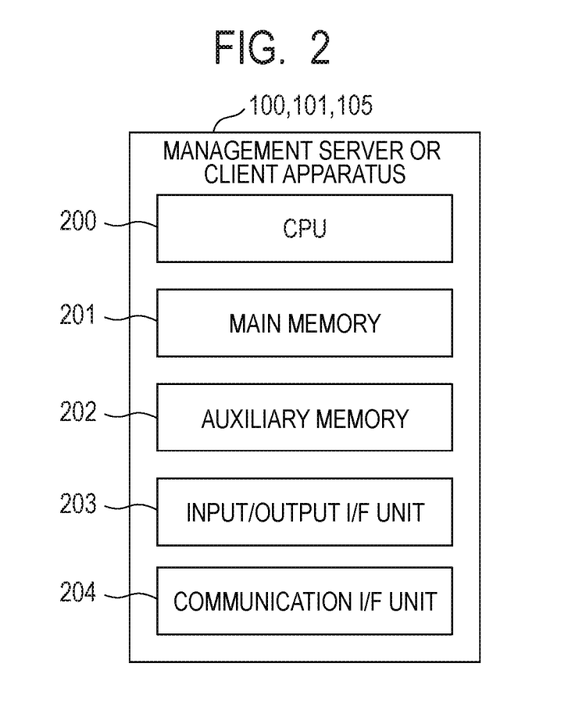
FIG. 2 is a diagram illustrating an exemplary hardware configuration of an information processing apparatus.

The hardware configuration of an information processing apparatus that implements any of the management server 100, the client apparatus 101, and the client apparatus 105 in FIG. 1 will now be described. FIG. 2 is a block diagram illustrating the internal structure of the information processing apparatus.

The information processing apparatus (any of the management server 100 and the client apparatuses 101 and 105) includes a CPU 200, a main memory 201, an auxiliary memory (secondary memory) 202, an input/output I/F (interface) unit 203, and a communication I/F unit 204. The CPU 200 is a unit that executes predetermined programs and instructs various sorts of control of the information processing apparatus. The main memory 201 is work memory used by the CPU 200 in executing programs and is implemented by RAM (Random Access Memory) or the like. The auxiliary memory 202 is a storage apparatus for permanently storing data and is implemented by an HDD (Hard Disk Drive) or an SSD (Solid State Drive). The auxiliary memory 202 also stores application programs and an OS (Operating System). Various programs stored in the auxiliary memory 202 are loaded into the main memory 201 when executed by the CPU 200.

The input/output I/F unit 203 includes a unit having the functionality of receiving the user's operational inputs, and a unit having the functionality of presenting information to the user. Examples of the unit that receives operational inputs include a mouse and a keyboard. On the other hand, examples of the unit having the functionality of presenting information to the user include a monitor and a speaker.

The communication I/F unit 204 can receive data from and transmit data to external apparatuses. Through a predetermined protocol, the communication I/F unit 204 can provide various sorts of management information about the network devices 102 recorded in the auxiliary memory 202 to the outside. The protocol may be, for example, HTTP (Hypertext Transfer Protocol) or SNMP (Simple Network Management Protocol). Examples of the external apparatuses include an external memory such as an external HDD and USB memory, computers connected over a network, and other network devices.

Figure 3:
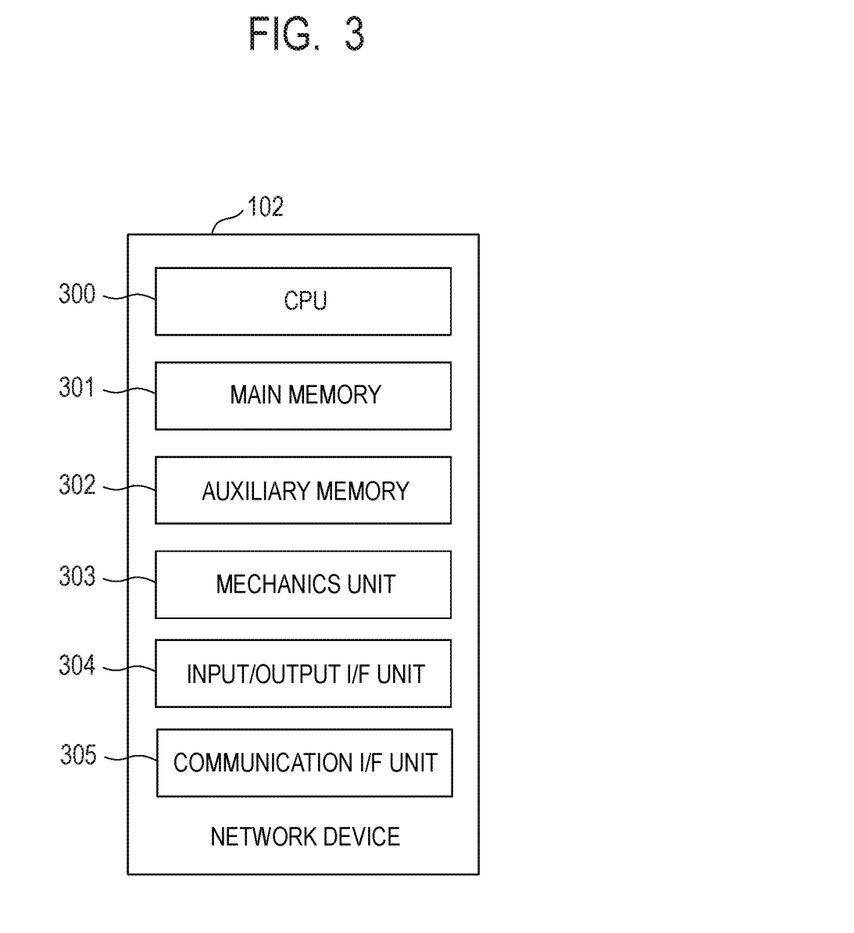
FIG. 3 is a diagram illustrating an exemplary hardware configuration of a network device.

The hardware configuration of the network devices 102 will now be described. FIG. 3 is a block diagram illustrating the internal structure of each network device 102. Details of a CPU 300, a main memory 301, and an auxiliary memory 302 are the same as the CPU 200, the main memory 201, and the auxiliary memory 202 of the information processing apparatus in FIG. 2, respectively, and therefore will not be described here.

A mechanics unit 303 represents mechanical components that implement functionality provided by the network device 102. For example, if the network device 102 is an image forming apparatus, exemplary components of the mechanics unit 303 include a print unit and a scan unit, which perform image forming in response to the user's execution instruction such as a print or copy instruction. An input/output I/F unit 304 may be implemented, for example, by a panel capable of touch operations. A communication I/F unit 305 connects to the network 104 to enable communication with other devices.

Figure 4:
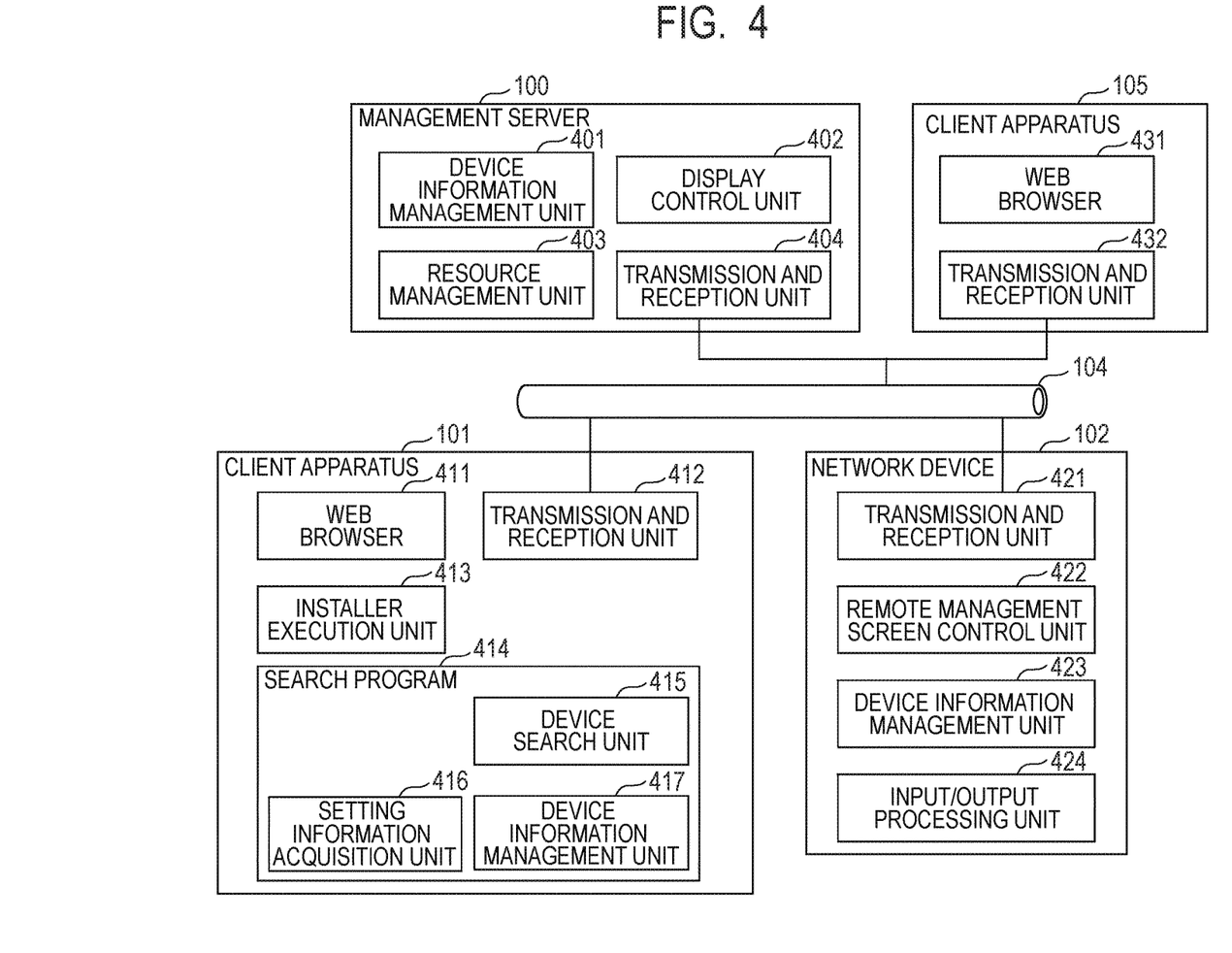
FIG. 4 is a diagram illustrating functional blocks showing an exemplary software module configuration.

The software configurations of the apparatuses illustrated in FIG. 1 will now be described. FIG. 4 is a functional block diagram of the apparatuses.

First, the software configuration of the management server 100 will be described. The management server 100 has a device information management unit 401, a display control unit 402, a resource management unit 403, and a transmission and reception unit 404. The device information management unit 401 manages, in a database, information about the network devices 102 being managed by the management server 100. Details of the information about the network devices 102 being managed will be described below.

The display control unit 402 controls web page generation, such as generating an HTML file in response to a request from the client apparatus 101 or 105. The resource management unit 403 controls providing an application file such as an installer in response to a request from the client apparatus 101. The transmission and reception unit 404 has the functionality of communicating with other apparatuses over the Internet 103.

The software configuration of the client apparatus 101 will now be described. A web browser 411 specifies a URI (Uniform Resource Identifier) to acquire a web page provided by the management server 100 or a network device 102, interprets the acquired page, and displays the page on the screen.

A transmission and reception unit 412 can communicate with other apparatuses over the network 104. An installer execution unit 413 is functionality provided by an operating system (OS) and is an execution engine that executes, under the user's instructions, an application installer received from the management server 100. The installer installs a search program 414 according to the present invention into the client apparatus 101. The search program 414 includes modules (a device search unit 415, a setting information acquisition unit 416, and a device information management unit 417) to be described below.

The device search unit 415 searches for the network devices 102 residing in the local network 104 and acquires network address information about each network device 102 as a search result. The setting information acquisition unit 416 acquires the serial number, model information about each network device 102 and the like by querying the device based on the above network address. The device information management unit 417 maintains a list of the network devices 102 being managed. The above list of the network devices 102 being managed is generated by passing information about the list of the network devices 102, managed in the management server 100, to the client apparatus 101 according to a method to be described below.

The software configuration of each network device 102 will now be described. A transmission and reception unit 421 can communicate with other apparatuses over the network 104. A remote management screen control unit 422 controls a remote management screen that provides, in response to a request from the client apparatus 101, operation information about the network device 102 (such as the error state and the use status). Details of the remote management screen will be described below.

A device information management unit 423 manages information about the network device 102. Examples of the information about the network device 102 include the network address of the device such as the IP address, and the serial number of the device. The information about the network device 102 may also include information about the amount of use by the user, such as the number of printed sheets in the printing apparatus, and information about the failure occurrence status and the lives of replaceable parts in the device. The information about the network device 102 may also include information stored in the device for the user's device use, such as an address book and document files. An input/output processing unit 424 enables the user to input and output information, and specifically represents software that controls the input/output I/F unit 304 such as a hardware panel.

The software configuration of the client apparatus 105 is the same as that of the client apparatus 101 and therefore will not be described here. A web browser 431 and a transmission and reception unit 432 of the client apparatus 105 correspond to the web browser 411 and the transmission and reception unit 412 of the client apparatus 101, respectively.

Figure 5:
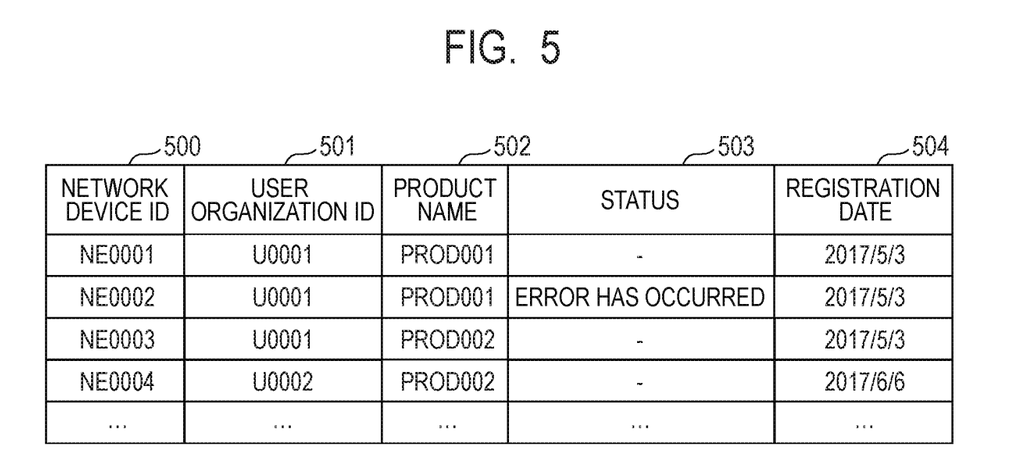
FIG. 5 is a diagram illustrating an exemplary device information management table in a device information management unit.

FIG. 5 illustrates a device information management table in the device information management unit 401 of the management server 100. The network devices 102 are registered in the table by a maintenance worker of a service provider via the client apparatus 105. In order for a network device 102 to be managed in the system, the network device 102 needs to be located in the user environment and also needs to be registered in the table.

A network device ID 500 stores an identifier for uniquely identifying each network device 102 being managed. A user organization ID 501 stores an identifier for uniquely identifying an organization to which the user of each network device 102 belongs. In the information stored in the management server 100, a user can access only information about network devices 102 assigned a user organization ID 501 corresponding to the organization to which the user belongs.

A product name 502 stores a character string that indicates the model of each registered network device 102. A status 503 stores information about the state of each network device 102. Examples of the status 503 include the occurrence of an error and running out of a consumable item. The device information management unit 401 updates the information in the status 503 in response to receiving information related to the status 503 from the network device 102 over the Internet 103. A registration date 504 shows the date on which the maintenance worker registered the information about each network device 102 in the device information management table.

Figure 6:
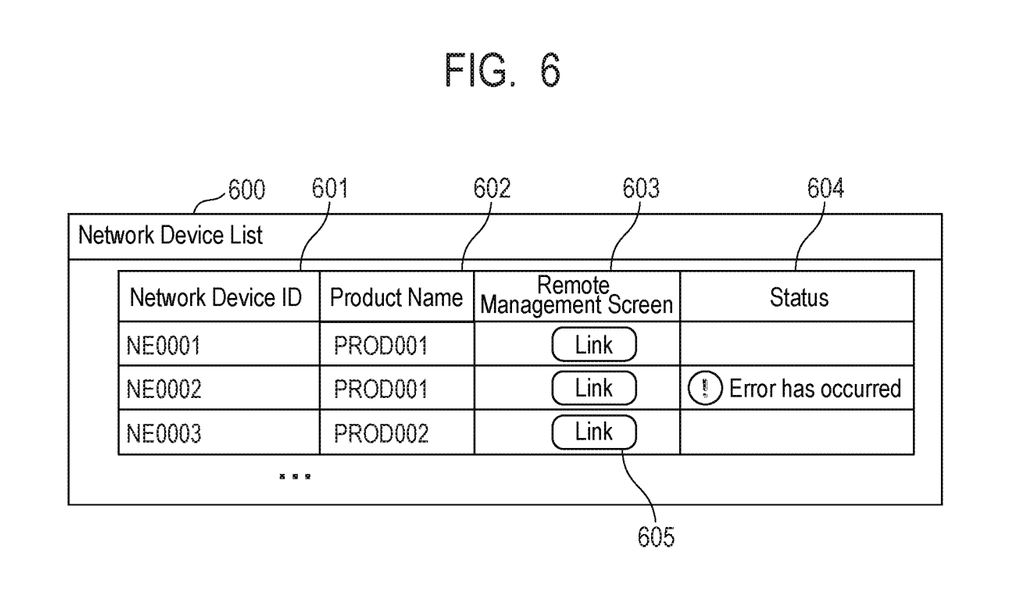
FIG. 6 is a diagram illustrating an exemplary network device list screen provided by a management server.

FIG. 6 illustrates a network device list screen 600 according to page information provided by the management server. Based on the device information management table in the device information management unit 401, the display control unit 402 provides the screen by generating page information in a description language such as HTML (HyperText Markup Language). The screen is accessed by the user of the network devices 102 using the web browser 411 of the client apparatus 101.

A network device ID 601 stores an identifier (such as the serial number) that uniquely identifies each network device 102. A product name 602 stores information that identifies the model of each network device 102. A remote management screen 603 is a column for placing a page object (for example, a link button 605) for controlling connection to the remote management screen provided by each network device 102. A status 604 stores information indicating the state of each network device 102. Links 605 are URI links for transitioning to the remote management screens of the respective network devices. Each page object (link button 605) is associated with a description included in the page information; the description is to execute a script that passes the device ID (the serial number), which is a parameter for identifying the network device being managed by the management server, to the search program executed in the client apparatus 101.

If the user presses a link 605, the search program 414 in the client apparatus 101 is started via the web browser 411 according to the description included in the page information and associated with the pressed object. The search program 414 performs the process of detecting the network devices 102 being managed in the local network 104 and transitioning to the remote management screen according to the detection result. Note that, for example, if the latest version of the search program 414 is not installed in the client apparatus 101, pressing the link button 605 causes the client apparatus 101 to perform control such as installing or updating the program.

Figure 7:
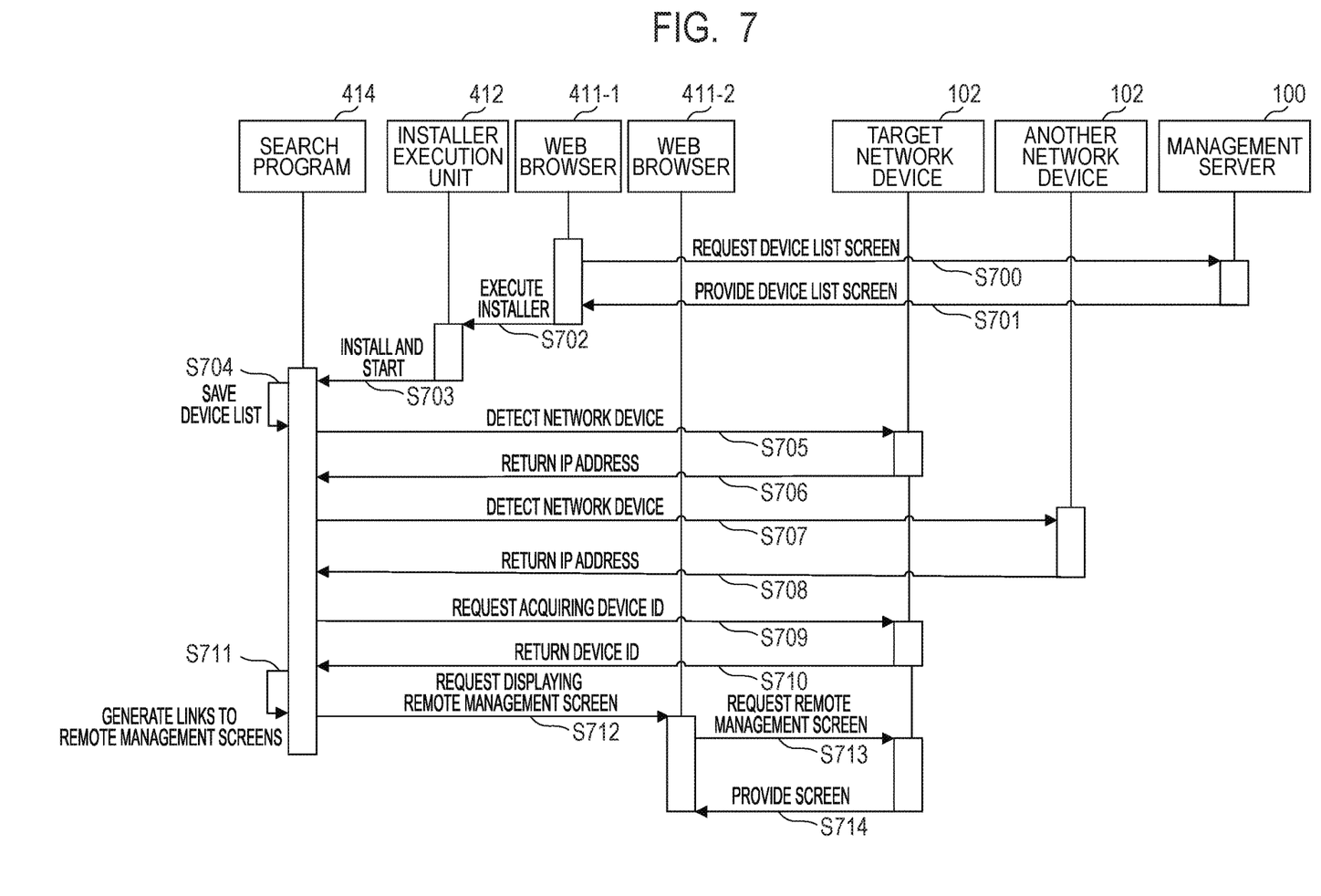
FIG. 7 is a sequence diagram illustrating an exemplary process flow of displaying a remote management screen.

FIG. 7 is a sequence diagram illustrating the details of operations of the apparatuses in displaying, in the web browser 411 of the client apparatus 101, the remote management screen of a target network device 102 in the embodiment. The sequential process is started when the user operates the web browser 411 to request, from the management server 100, a list of network devices being managed. In the embodiment, the web browser 411 can use multiple tabs to open multiple web pages. For convenience, a tab in which the user's initial operation is performed will be referred to as a first web browser 411-1 as distinguished from a second web browser 411-2 to be described below.

First, at S700, the first web browser 411-1 requests a device list screen from the management server 100. At S701, based on the user organization ID of the accessing user, the management server 100 determines a list of network devices 102 that the user is allowed to view, and provides the above-described network device list screen 600 to the web browser 411-1.

Then, in response to the user selecting, in the network device list, a link 605 corresponding to a network device for which the user desires access to the remote management screen, the process proceeds to S702. At S702, the web browser 411-1 executes the search program 414 if the search program 414 is already installed in the client apparatus 101. If, however, the search program 414 is not installed in the client apparatus 101, the web browser 411-1 requests the installer execution unit 413 provided by the OS to perform the process of installing the search program 414. At this point, the web browser 411-1 provides, as a parameter, a link to an installer entity and the network device list, displayed on the above device list screen, to the installer execution unit 413. Details of providing the parameter will be described below.

Figure 10:
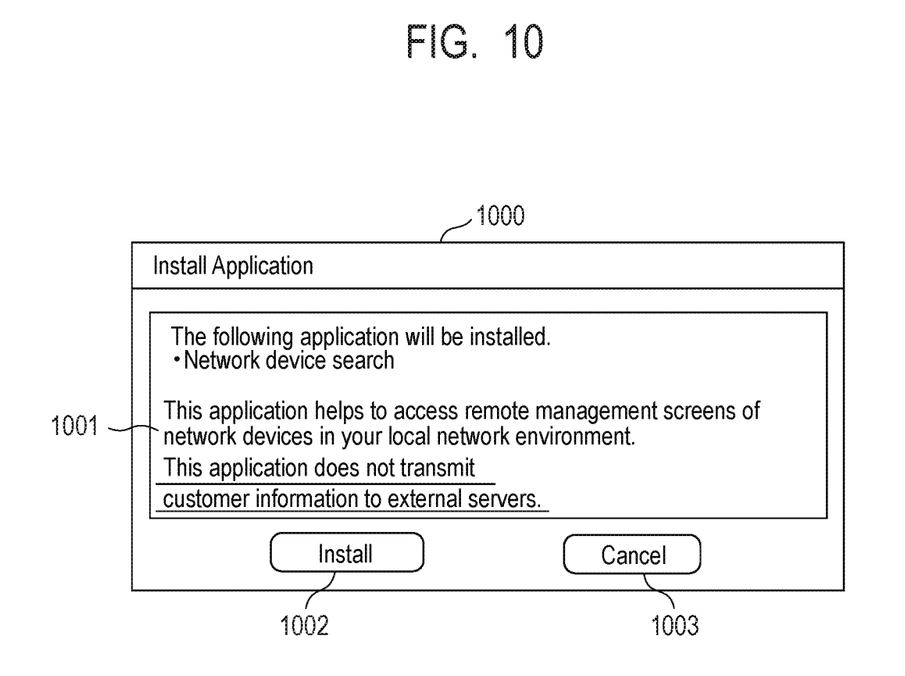
FIG. 10 is a diagram illustrating an exemplary installation confirmation screen provided by an installer execution unit.

At S703, the installer execution unit 413 installs the search program 414 into the client apparatus 101 by executing an installer downloaded from the management server 100. Rather than from the management server 100, the search program 414 may also be downloaded from some other location such as an app store service provided by an OS vendor. Before the installation, the web browser 411-1 displays an application installation confirmation screen as shown in FIG. 10 to ask the user whether to install the search program 414. The installation confirmation screen will be described below.

If the search program 414 is already installed in the client apparatus 101, the installation process is skipped. The web browser 411-1 specifies a required parameter and proceeds to the execution of the search program 414.

If the user permits the installation, the installation is performed and then the search program 414 is executed. At this point, the installer execution unit 413 passes, as an execution parameter, the network device list acquired at S702 as described above to the search program 414.

At S704, the search program 414 records the received network device list in the auxiliary memory 202 so that the list can be referred to when the program is started next time. At S705, the search program 414 searches for the network devices 102 located in the local network 104. At S706, IP address information is returned as a response from the target network device 102 located in the local network 104 and for which the user desires access to the remote management screen.

Regarding the search for the network devices 102, the local network 104 may include not only the target network device 102 but also other network devices 102. As such, at S707, the search program 414 also detects another network device 102 that is not the target. At S708, the search program 414 receives an IP address as a response from the other network device 102.

Although FIG. 7 shows only one other network device, two or more other network devices may exist. In that case, S707 and S708 are repeated as required.

At S709, a request to acquire the network device ID is issued to each network device 102 detected. Here, the network device IDs of both the target network device 102 and the other network device 102 are to be acquired. At S710, the network devices 102 return the network device IDs. At S711, the search program 414 saves the network device ID information and the IP address information acquired at S706, S708, and S710, and generates URL (Uniform Resource Locator) links to the remote management screens.

At S712, based on the acquired IP address information about the network devices 102, the search program 414 starts a web browser 411-2 and requests displaying the remote management screen. The web browser started here opens a tab different from the tab of the web browser 411-1 that has been displaying the device list screen. At S713, the web browser 411-2 requests the remote management screen from the target network device by specifying a URL that includes the IP address. Finally, at S714, the target network device 102 provides the remote management screen by transmitting resources constituting the requested screen to the web browser 411-2.

Through the above process, the user can use the web browser 411 to identify the target network device 102 and access the remote management screen.

Figure 8:
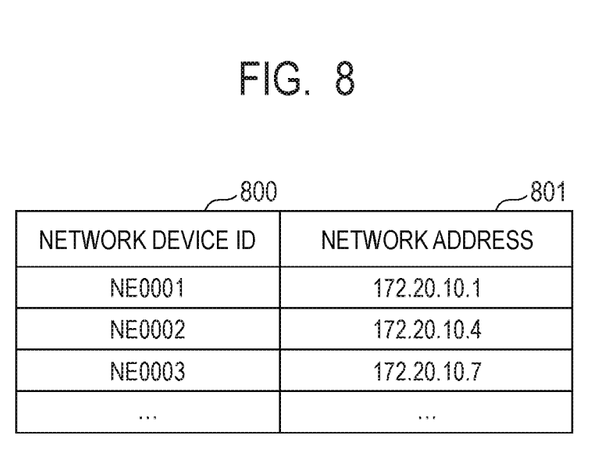
FIG. 8 is a diagram illustrating an exemplary device address management table in a device information management unit.

FIG. 8 illustrates a device address management table in the device information management unit 417 of the search program 414. A network device ID 800 stores items corresponding to items in the device information management table in the management server 100. A network address 801 stores a private IP address set for each network device. Each private IP address is local address information locally used in the network environment (such as the LAN) in which the network device is located, and the information is set and managed by the customer himself/herself Although the private IP addresses in FIG. 8 follow IPv4 as an exemplary protocol, any protocol that can identify the network devices 102 is applicable. The table is updated when the processing at S704 and S711 in the sequence in FIG. 7 is performed. The search program 414 can use the table to find the private IP address of each network device 102 and provide access to the remote management screen of a specified network device 102.

Figure 9:
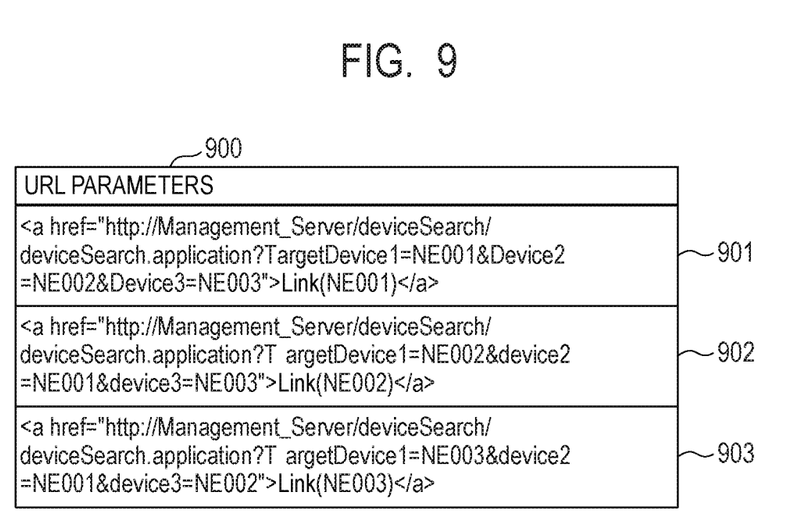
FIG. 9 is a diagram illustrating exemplary URL parameters.

FIG. 9 describes an exemplary manner in which the web browser 411 provides the link to the installer entity and the network device list as a parameter to the installer execution unit 413 as described for S702 in the sequence in FIG. 7. One specific manner to provide a link to an installer displayable in a web browser is the ClickOnce technology provided by Microsoft Corporation. The embodiment describes that the system uses ClickOnce, although this does not limit the scope of the present invention.

URL parameters 900 shown in FIG. 9 correspond to the URLs set for the links 605 in FIG. 6. URL parameters 901, 902, and 903 correspond to the respective links to the network devices having the network device IDs "NE001," "NE002," and "NE003."

As an example, the link 901 to "NE001" will be described. For the target network device, the network device ID "NE001" is specified as "TargetDevice." For the other network devices, the network device IDs "NE002" and "NE003" are specified as "OtherDrive." The search program 414 serving as a ClickOnce application receives the URL parameter via the installer execution unit 413 serving as a ClickOnce loader, and stores the parameter in the URL property upon startup. Subsequently, in the processing at S704, the search program 414 refers to the URL property and analyzes the data therein. The search program 414 then stores, in the device address management table, the information about the target network device ID and the information about the list of the other network device IDs acquired.

FIG. 10 illustrates an installation confirmation screen 1000 displayed at S703 in FIG. 7. The screen is displayed before the installer execution unit 413 installs the search program 414 into the client apparatus 101. A description 1001 is a sentence indicating to the user that the purpose of the search program 414 is searching in a local network environment for network devices. An installation button 1002 is to be pressed when the user permits the installation of the search program 414. Pressing the installation button 1002 causes the installer execution unit 413 to install the search program into the client apparatus 101. A cancel button 1003 is to be pressed when the user rejects the installation of the search program 414. Pressing the cancel button 1003 causes the installer execution unit 413 to stop the installation process.

Figure 11:
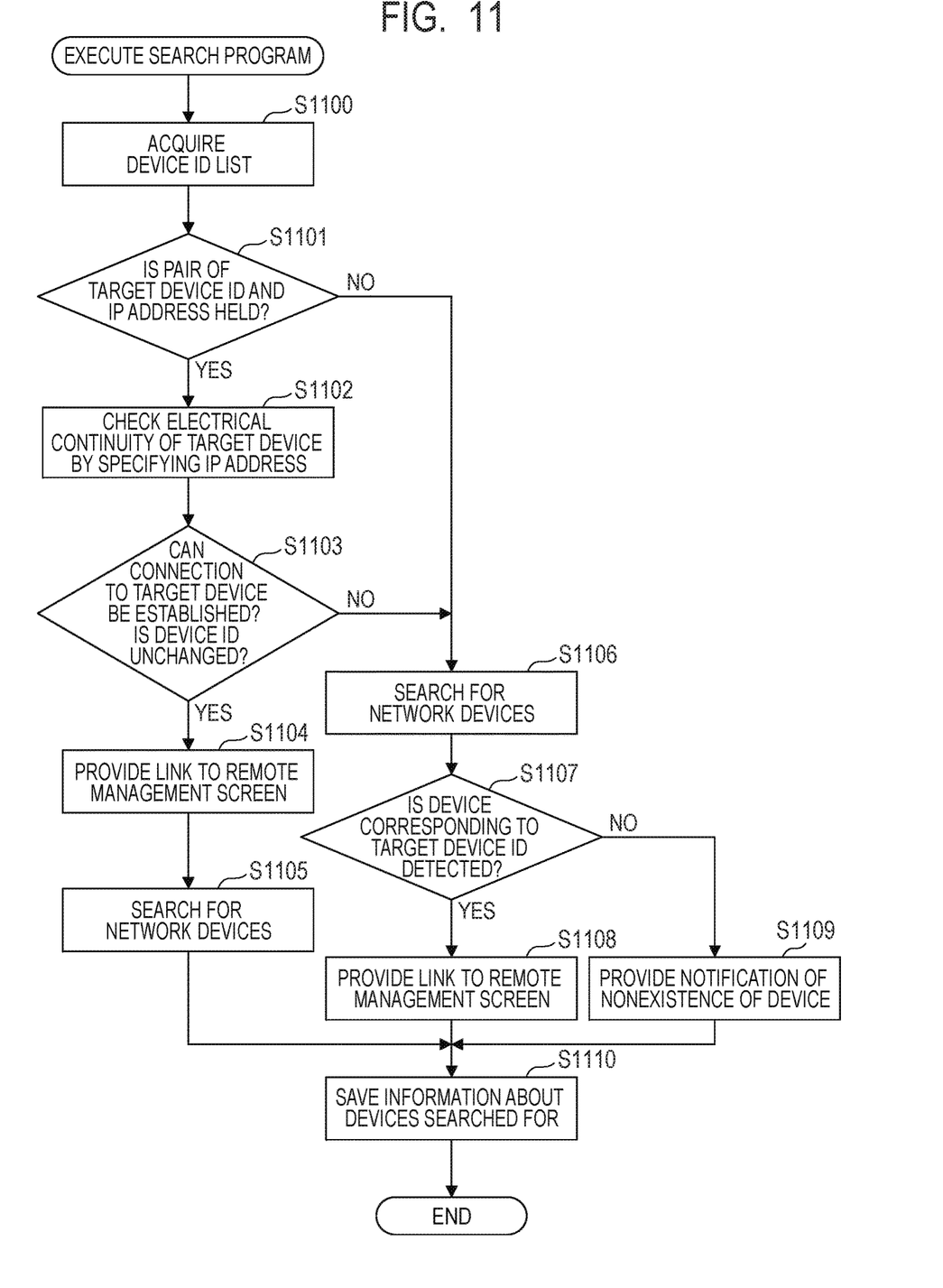
FIG. 11 is a flowchart illustrating an exemplary method of providing a link to the remote management screen.

FIG. 11 is a flowchart illustrating a method in which the search program 414 installed in the client apparatus 101 provides the link to the remote management screen of the network device specified by the user. The operations in the flowchart are implemented by the cooperation of the device search unit 415, the setting information acquisition unit 416, and the device information management unit 417 in the search program 414. The flowchart takes into account also the operations upon the second and subsequent startups of the search program 414, rather than only the operations immediately after the installation of the search program 414 into the client apparatus 101.

First, at S1100, the network device ID list is acquired as an input parameter in the manner illustrated in FIG. 9. The data passed as the parameter here is the device ID of the network device for which the user desires to view the remote management screen, and the device IDs of the other network devices. At S1101, it is determined whether a pair of the target network device ID and its corresponding IP address is stored in the device address management table. If so, the process proceeds to S1102; otherwise, the process proceeds to S1106.

At S1102, the electrical continuity of the target network device 102 is checked by specifying the IP address. At S1103, it is determined whether connection to the target network device 102 can be established and whether the device ID matches the value held in the device address management table. If so, the process proceeds to S1104; otherwise, the process proceeds to S1106.

At S1104, a URI link to the remote management screen is generated by specifying the IP address, and displayed on the screen. Details of the screen displayed here will be described below with reference to FIG. 12. At S1105, network devices 102 located in the local network 104 are searched for in case that the user desires to move to the remote management screens of other network devices. The process then proceeds to S1110.

If it is determined at S1101 that the pair of the target device ID and the IP address is not held, network devices are searched for at S1106 in order to provide the link to the remote management screen. The process then proceeds to S1107. This is also the case if it is determined at S1103 that connection to the target device cannot be established or the device ID has been changed. At S1107, it is determined whether a network device 102 corresponding to the target network device ID is detected.

If a network device 102 corresponding to the target network device ID is detected at S1107, the process proceeds to S1108; otherwise, the process proceeds to S1109. At S1108, a link to the remote management screen is generated using the IP address of the network device searched for at S1106. Details of the screen displayed with the link will be described below with reference to FIG. 12. At S1109, a message indicating the nonexistence of the user-desired network device 102 is displayed. At S1110, pairs of the network device IDs and the IP addresses of all the network devices 102 searched for are stored in the device address management table. The process then terminates.

Figure 12:
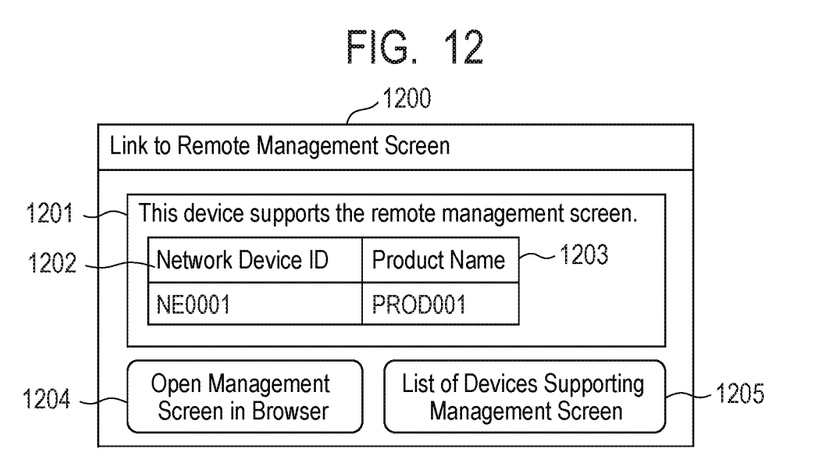
FIG. 12 is a diagram illustrating an exemplary link screen of a search program, containing the link to the remote management screen.

FIG. 12 illustrates a link screen 1200 of the search program 414, containing the link to the remote management screen. The screen is displayed at S1104 and S1108 of the flowchart in FIG. 11.

A message 1201 indicates whether the remote management screen is available. The message shows the result of the determination at S1103 and S1107 of whether the user-desired network device 102 supports the remote management screen. A network device ID 1202 stores the identifier that uniquely identifies the network device 102. A product name 1203 indicates the product type of the network device 102.

A remote management screen button 1204 provides access to the remote management screen using the private IP address acquired from the network device. If the user presses the remote management screen button 1204, the processing at S712 described above in FIG. 7 is performed. The search program 414 starts the browser 411-2 by specifying the URL generated using the private IP address. The browser 411-2 accesses a web server of the network device corresponding to the private IP address and displays the remote management screen provided by the network device.

A button 1205 provides a list of devices supporting the remote management screen. If the user presses the button 1205, the screen transitions to a screen to be described below in FIG. 13, which lists network devices supporting the remote management screen.

Figure 13:
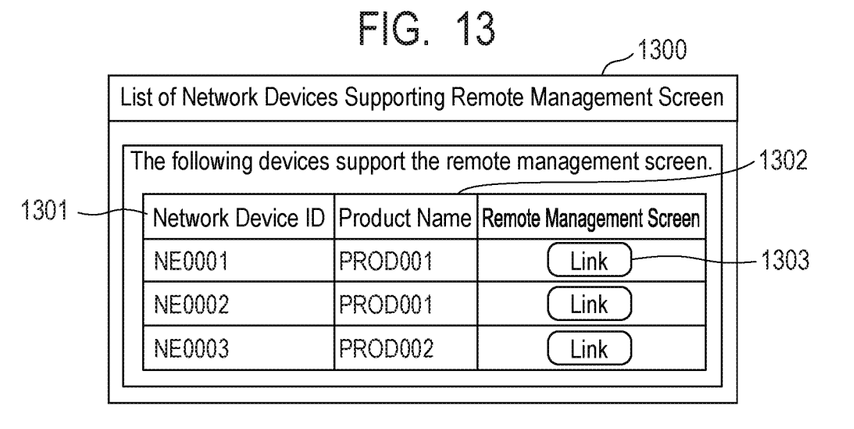
FIG. 13 is a diagram illustrating an exemplary supporting device list screen of the search program.

FIG. 13 illustrates a supporting device list screen 1300, provided by the search program 414, for displaying the list of network devices supporting the remote management screen. The screen is generated based on the network device IDs 800 and the network addresses 801 stored in the device address management table. A network device ID 1301 and a product name 1302 are similar to the network device ID 1202 and the product name 1203 in FIG. 12, respectively. Link buttons 1303 are buttons for transitioning to the remote management screens of the respective network devices.

With the screen, the user can use the remote management screens of the network devices 102 other than the network device 102 that the user has originally specified on the screen provided by the management server 100. In doing so, the user also does not need to access the management server 100 again.

Figure 14:
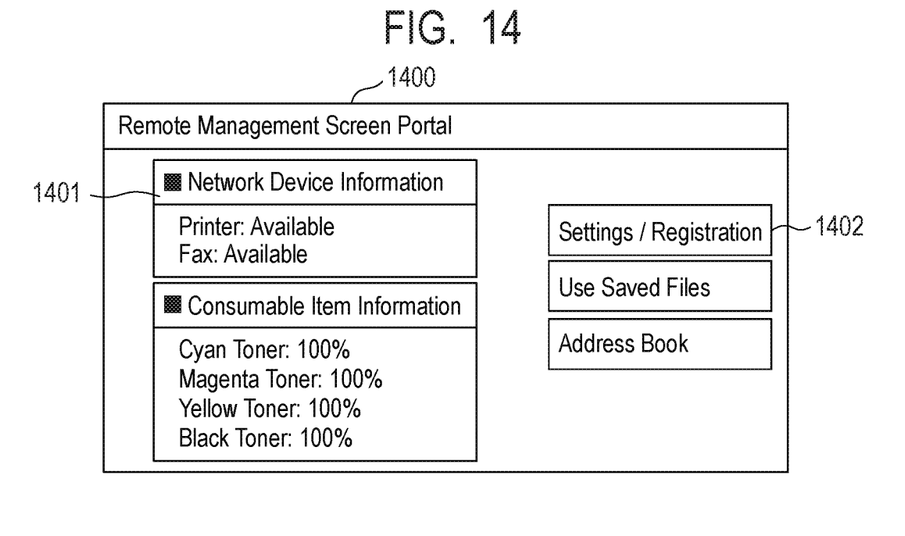
FIG. 14 is a diagram illustrating an exemplary remote management screen of the network device.

FIG. 14 is a schematic diagram of a remote management screen 1400 provided by a network device 102. A network device information area 1401 indicates availability statuses, and the remaining amounts of consumable items. Menu buttons 1402 enable access to functionality provided by the network device 102, such as settings, access to saved document files, and an address book.

The above embodiment has described the way in which the network devices 102 managed by the management server 100 residing outside the local network 104 are identified and then the remote management screen is accessed. An advantage of this way is the ability to access the remote management screen without transferring the network addresses of the devices to the outside of the local network 104.

Second Embodiment

In the above first embodiment, the client apparatus 101 has been described as a PC. The present invention, however, is also applicable to the cases in which the client apparatus 101 is a mobile device such as a tablet or a smartphone. A second embodiment describes a method of providing the remote management screen to the user on the client apparatus 101 that is a mobile device.

The system configuration, hardware configuration, software configuration, and provided screens in the second embodiment are the same as in the above first embodiment and therefore will not be described here. Only what are different from the first embodiment will be described below with respect to the process sequence in FIG. 7 and the process flow in FIG. 11.

If the client apparatus 101 is a mobile device, again, the search program 414 may be preinstalled in the mobile device. The description here assumes that the search program is preinstalled.

If the search program is not installed yet, the installer execution unit 413 detects the fact in the processing at S702 in FIG. 7. The installer execution unit starts a store application and guides the user to install an appropriate native application.

The link buttons 605 in the network device list screen 600 provided by the management server 100 and displayed in the web browser need to be implemented as buttons for invoking the native application. One method of invoking a native application of a mobile device through a link button implemented in a web page in this manner is using the mechanism of the Web Share API.

The Web Share API (Application Programming Interface) is a technology disclosed by Google LLC. The technology enables sharing web page information by passing data from a web page to a native application (an intent) installed in an OS. The technology can be used in any mobile device having the Android OS. The mechanism is started with a tap operation on a button in the web page and can present sharer application candidates in menu form to a user.

In the second embodiment, the following description assumes that the mobile device has the Android OS and that the network device list screen 600 provided by the management server 100 uses the mechanism of the Web Share API.

FIG. 9 in the above first embodiment illustrates the case in which the length of a character string sufficient for allowing the parameter to be transmitted is ensured. If, however, the client apparatus 101 is, e.g., a mobile device, the length of a character string sharable with native applications may be limited. The display control unit 402 therefore switches the network device list screen 600 according to the type of the client apparatus 101, such as a PC or a mobile device. If the client apparatus 101 is a mobile device, only the network device ID of the network device 102 for which the user desires displaying the remote management screen is passed as the parameter.

The management server 100 includes, in the description corresponding to each page object (link button 605) in the network device list screen 600: a description including a function for implementing the Web Share API (navigator.share); and data to be shared with the native application. The Web Share API allows specifying the three items "Title," "Text," and "Url" as sharable objects. In the embodiment, the management server 100 stores, as the data to be shared, the network device ID in the form of a value of character string data type in the "Text" object, thereby providing the page information about the network device list screen 600.

In this manner, even if the client apparatus 101 is a mobile device, the user can move from the screen provided by the management server 100 to the remote management screen of the network device 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments of the present invention have been described above, the present invention is not limited to these embodiments. Rather, various variations and modifications may be made within the gist of the present invention.

According to examples of the present invention, a method can be provided in which, via a network-device-related website provided by a management system in the Internet and displayed in a web browser, a management screen provided by a network device is accessed while the management system does not need to have local information about the network device such as a private IP address.

The present invention is not limited to the above embodiments, but various modifications and variations may be made without departing from the spirit and scope of the present invention. The following claims are thus appended in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising: an information processing apparatus connected to a network environment where a network device is located; and a management server managing the network device from outside the network environment without holding local address information used in the network environment where the network device is located, wherein
the management server comprises a providing unit that provides page information, the page information comprising: a description for passing an identifier for identifying the network device being managed to an application executed in the information processing apparatus; and a page object associated with the description, and
the information processing apparatus comprises, as functionality of the application:
a search unit that performs a search process in the network environment if the page object is selected via a screen displayed based on the page information in a web browser executed in the information processing apparatus; and
a presentation unit that, if a network device corresponding to the identifier passed from the web browser to the application in response to selecting the page object is found in the search process, presents information for accessing a management screen provided by the network device, the information being presented using local address information acquired from the network device corresponding to the identifier and found in the search process.

2. The system according to claim 1, wherein
the management server further comprises a transmission unit for causing the information processing apparatus to download the application,
if the application has not been installed in the information processing apparatus when the page object is selected, the application is downloaded from the management server and installed, and
after the application is installed, the search unit performs the search process and the presentation unit presents the information as the functionality of the application installed.

3. The system according to claim 2, wherein, if the application has not been installed in the information processing apparatus when the page object is selected, a notification screen for gaining permission to install the application is displayed, and if the permission is gained via the notification screen, the application is downloaded from the management server and installed.

4. The system according to claim 3, wherein the notification screen notifies that no local address information is to be transmitted to servers outside the network environment.

5. The system according to claim 1, wherein, based on the information for accessing the management screen presented by the presentation unit, the web browser accesses the network device corresponding to the identifier and found in the search process, thereby displaying the management screen provided by the network device.

6. The system according to claim 1, wherein,
in the search process performed if the page object is selected, the search unit acquires local address information from the network device corresponding to the page object and from a network device being managed by the management server and different from the network device corresponding to the page object, and
the presentation unit uses the local address information acquired to present the information for accessing the management screen provided by the network device corresponding to the page object, and information for accessing a management screen provided by the network device being managed by the management server and different from the network device corresponding to the page object.

7. The system according to claim 1, wherein the local address information is a private IP address.

8. The system according to claim 1, wherein the identifier is a serial number of the network device.

9. A method using a system comprising: an information processing apparatus connected to a network environment where a network device is located; and a management server managing the network device from outside the network environment without holding local address information used in the network environment where the network device is located, the method comprising:

by the management server, providing page information comprising: a description for passing an identifier for identifying the network device being managed to an application executed in the information processing apparatus; and a page object associated with the description; and by the information processing apparatus, performing a search process in the network environment if the page object is selected via a screen displayed based on the page information in a web browser executed in the information processing apparatus, and if a network device corresponding to the identifier passed from the web browser to the application in response to selecting the page object is found in the search process, presenting information for accessing a management screen provided by the network device, the information being presented using local address information acquired from the network device corresponding to the identifier and found in the search process.

10. An information processing apparatus that is connected to a network environment where a network device is located and that executes a web browser, the apparatus comprising, at least one memory storing instructions related to an application, and at least one processor executing the instructions causing the information processing apparatus to:

perform a search process in the network environment if a page object is selected via a screen displayed in the web browser, the screen being displayed based on page information provided by a management server, wherein the page information includes a description for passing an identifier for identifying a network device being managed by the management server to the application, and the page object associated with the description; and if a network device corresponding to the identifier passed from the web browser to the application in response to selecting the page object is found in the search process, present information for accessing a management screen provided by the network device, the information being presented using local address information acquired from the network device corresponding to the identifier and found in the search process.

11. The information processing apparatus according to claim 10, wherein, if the application has not been installed in the information processing apparatus when the page object is selected, the application is downloaded from the management server and installed, and after the application is installed, the search process is performed and the information is presented.

12. The information processing apparatus according to claim 10, wherein, if the page object is selected, according to a description included in the page information and comprising a function for sharing data corresponding to the page object, the identifier included in the page information and described as the data to be shared is passed from the web browser to the application.

13. The information processing apparatus according to claim 10, wherein, based on the presented information for accessing the management screen, the web browser accesses the network device corresponding to the identifier and found in the search process, thereby displaying the management screen provided by the network device.

14. The information processing apparatus according to claim 10, wherein, in the search process performed if the page object is selected, local address information is acquired from the network device corresponding to the page object and from a network device being managed by the management server and different from the network device corresponding to the page object, and the information for accessing the management screen provided by the network device corresponding to the page object, and information for accessing a management screen provided by the network device being managed by the management server and different from the network device corresponding to the page object are presented by using the acquired local address information.

15. The information processing apparatus according to claim 10, wherein the local address information is a private IP address.

16. A method using an information processing apparatus that is connected to a network environment where a network device is located and that executes a web browser, the method comprising:

performing a search process in the network environment as functionality of an application if a page object is selected via a screen displayed in the web browser, the screen being displayed based on page information provided by a management server, the page information comprising: a description for passing an identifier for identifying a network device being managed by the management server to an application; and the page object associated with the description; and if a network device corresponding to the identifier passed from the web browser to the application in response to selecting the page object is found in the search process, presenting, as the functionality of the application, information for accessing a management screen provided by the network device, the information being presented using local address information acquired from the network device corresponding to the identifier and found in the search process.

17. A non-transitory computer-readable storage medium having stored thereon a program for a method using an information processing apparatus that is connected to a network environment where a network device is located and that executes a web browser, the method comprising:

performing a search process in the network environment as functionality of an application if a page object is selected via a screen displayed in the web browser, the screen being displayed based on page information provided by a management server, the page information comprising: a description for passing an identifier for identifying a network device being managed by the management server to an application; and the page object associated with the description; and if a network device corresponding to the identifier passed from the web browser to the application in response to selecting the page object is found in the search process, presenting, as the functionality of the application, information for accessing a management screen provided by the network device, the information being presented using local address information acquired from the network device corresponding to the identifier and found in the search process.

* * * * *